March 22, 1932.　　　A. A. HOEY　　　1,850,456
TENTER CHAIN
Filed Sept. 22, 1930
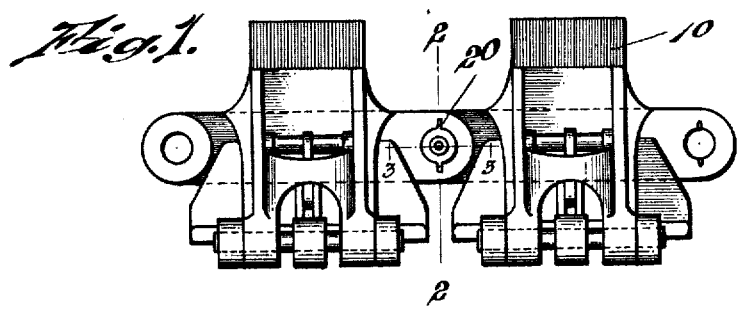
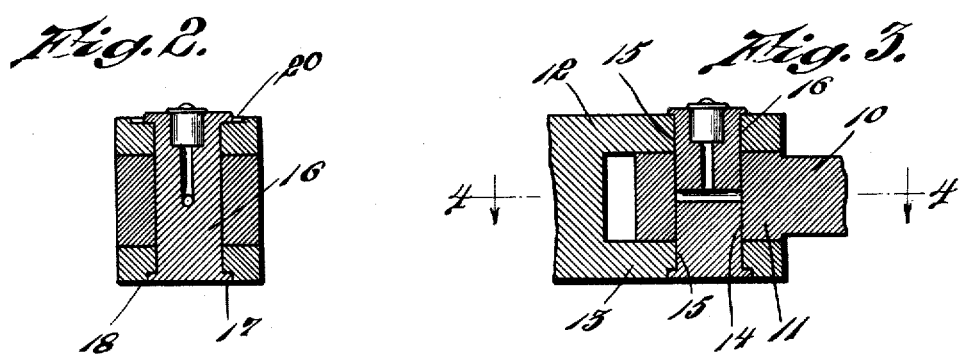
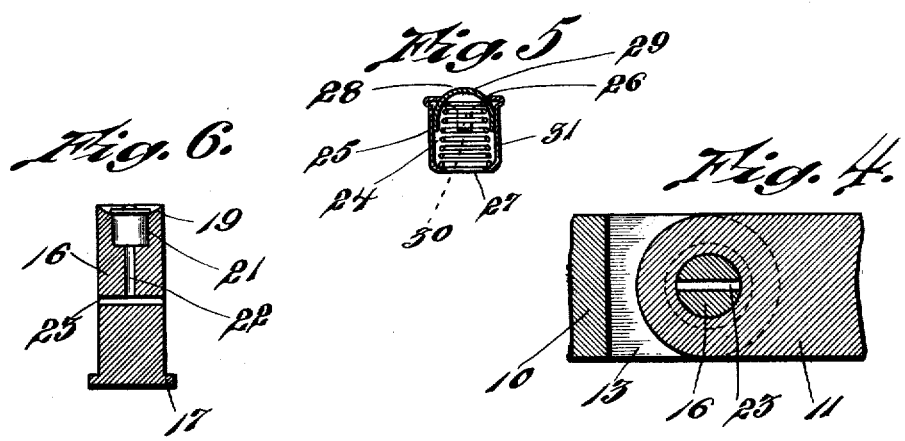
INVENTOR.
Arthur A. Hoey
BY Barlow & Barlow
ATTORNEYS.

Patented Mar. 22, 1932

1,850,456

UNITED STATES PATENT OFFICE

ARTHUR A. HOEY, OF PROVIDENCE, RHODE ISLAND, ASSIGNOR TO HOEY MANUFACTURING COMPANY, A CORPORATION OF RHODE ISLAND

TENTER CHAIN

Application filed September 22, 1930. Serial No. 483,520.

My present invention relates to tenter link chains, and has particular reference to improvements in the lubrication thereof.

The tenter links forming a chain are usually riveted together, the rivets being provided with longitudinal passageways and connecting radial outlet passageways for feeding lubricating oil to the relatively moving parts. These passageways become clogged with dirt and lint during use, and must be periodically cleaned out by means of a thin wire or the like; such cleaning out, however, is rarely thorough, as it is difficult to clean out the radial passageways. The principal object of my invention is to provide an oiling arrangement which cannot become clogged with dirt and lint.

A further difficulty in providing effective lubrication in present day tentering chains resides in providing an amount of lubricating oil sufficient to properly protect the relatively moving parts between oilings. This difficulty increases with the length of run, with the number of links, and with the inability of the oiling attendant to properly clean out the oil passages and completely fill each oil passage with fresh clean oil. A further object of my invention is therefore to maintain a sufficient reservoir of oil in each rivet to properly take care of unusual and excessively long operating periods.

With these and other objects and advantageous features in view, the invention consists of a novel arrangement of parts more fully disclosed in the detailed description following, in conjunction with the accompanying drawings, and more particularly set forth in the appended claim.

In the drawings:

Fig. 1 is a plan view of two connected tenter links forming part of a chain;

Fig. 2 is a vertical section on the line 2—2 of Figure 1;

Figure 3 is a vertical section on the line 3—3 of Figure 1;

Figure 4 is a horizontal section on the line 4—4 of Figure 3;

Fig. 5 is a longitudinal section through the oil reservoir; and

Fig. 6 is a longitudinal section showing the rivet and its oil reservoir before assembly in the chain.

It has been found desirable to provide a self-closing oil reservoir for a tenter link rivet pin which will effectively exclude dirt and lint and which will hold a substantial amount of clean lubricating oil for lubricating the relatively movable tenter link portions. I have therefore enlarged the oil passage at the upper end of the rivet pin and inserted an oil reservoir therein which has a spring pressed closure; and the following is a detailed description of a preferred structural embodiment of my invention.

Referring to the drawings, the tenter links 10 each have the usual construction with a fixed jaw provided on the body portion and a movable jaw hingedly mounted on the body portion and cooperating with the fixed jaw, the body portion having a centrally positioned connecting ear 11 at one end and spaced connecting ears 12, 13 at the other end, and the ears having bores 14, 15 to accommodate rivets 16 which are passed through the bores of the contiguous ears of adjacent links.

After assembly, the head 17 of each rivet 16 is seated in a corresponding recess 18 of the lower ear 13, and the cupped end 19, (note Figure 6) is flanged over the top of the upper ear 12, the flange being punched or indented into recesses 20 provided in the upper face of the ear 12, so as to lock the rivet in the spaced ears 12, 13.

Each rivet has a relatively wide bore 21 at the upper end communicating with a central vertical passageway 22 which in turn communicates with radial passageways 23. These radial passageways may be staggered vertically, or may be disposed at an acute angle to each other; but the preferred construction is to form the radial passageways in alignment, the rivets being locked in the spaced connecting ears so as to bring the ends of the passageways 23 adjacent the line of pull of the chain.

An oil reservoir 24 is mounted in the bore 21 with a force fit, and includes a metal casing 25, preferably stamped out of sheet metal, and having a central opening 26 at the upper end and a central opening 27 at the lower end, the lower end being curved inwardly adjacent the opening 27; a closure member 28, with a rounded end 29 adapted to contact with the sides of and to project through the opening 26, and with spaced guide legs 30 engaging the inner wall of the casing, is normally pressed upwardly to close the opening 26 by a coil spring 31 which has its lower end seated in the curved lower end of the casing.

As will be noted in Figure 3, the flanging of the upper end of the rivet preferably eliminates the original cup shown in Figure 6, and thus removes the usual upper end groove and reduces the opportunity for the dirt and lint to collect. The spring pressed closure keeps out the dirt and lint, and the rivet is therefore continually oiled at the points of maximum pull with clean oil from the oil reservoir. The positioning of the oil reservoir in the upper connecting ear does not unduly weaken the rivet, as this portion of the rivet receives only half the total pull; in addition, the easy accessibility of the oil reservoir facilitates replenishing of the oil supply.

While I have described a specific structural embodiment of my invention, it is obvious that desired changes in arrangement and proportions may be made, without departure from the spirit and the scope of the invention as defined in the appended claim.

I claim:

In a tenter link chain, a series of tenter links, fixed jaws on the body portions of the links, movable jaws hingedly mounted in the body portions and cooperating with said fixed jaws, connecting ears on the ends of the body portion provided with bores and recesses in the upper face of one of said ears, rivets positioned in the bores of contiguous connecting ears of adjacent links, each rivet having a head end and a flange end, portions of the flange indented into said recesses to prevent the rivet from rotating, said flange end having an axial bore, the center portion of the rivet having an axial oil passageway communicating with said axial bore and a radial oil passageway communicating with said axial oil passageway, and an oil reservoir in the flange end of each rivet provided with a spring pressed closure and communicating with said axial passageway.

In testimony whereof I affix my signature.

ARTHUR A. HOEY.